US007362495B2

(12) United States Patent
Mangrum

(10) Patent No.: US 7,362,495 B2
(45) Date of Patent: Apr. 22, 2008

(54) ELECTROSTATIC FINS FOR A MEMS DEVICE

(75) Inventor: Brett A. Mangrum, Dallas, TX (US)

(73) Assignee: Texas Instruments Incorporated, Dallas, TX (US)

(*) Notice: Subject to any disclaimer, the term of this patent is extended or adjusted under 35 U.S.C. 154(b) by 31 days.

(21) Appl. No.: 11/409,674

(22) Filed: Apr. 24, 2006

(65) Prior Publication Data

US 2007/0247699 A1 Oct. 25, 2007

(51) Int. Cl.
*G02B 26/00* (2006.01)
*G02B 5/08* (2006.01)
*G02B 7/182* (2006.01)

(52) U.S. Cl. ...................... 359/295; 359/224; 359/291; 359/855; 359/872

(58) Field of Classification Search ................ 359/223, 359/224, 225, 291, 292, 295, 298, 855, 872
See application file for complete search history.

(56) References Cited

U.S. PATENT DOCUMENTS

| | | | | |
|---|---|---|---|---|
| 5,216,537 | A | 6/1993 | Hornbeck | |
| 6,285,490 | B1 | 9/2001 | Meier et al. | |
| 6,383,357 | B1 | 5/2002 | Maciossek | 205/136 |
| 6,487,001 | B2 | 11/2002 | Greywall | 359/292 |
| 6,552,840 | B2 | 4/2003 | Knipe | 359/291 |
| 6,583,921 | B2 * | 6/2003 | Nelson | 359/291 |
| 6,825,967 | B1 | 11/2004 | Chong et al. | 359/290 |
| 6,825,968 | B2 | 11/2004 | Aubuchon | 359/290 |
| 6,873,450 | B2 * | 3/2005 | Patel et al. | 359/291 |
| 6,974,713 | B2 | 12/2005 | Patel et al. | |
| 7,011,415 | B2 | 3/2006 | DiCarlo et al. | |
| 7,139,113 | B1 * | 11/2006 | Chu et al. | 359/291 |
| 7,245,415 | B2 * | 7/2007 | Pan | 359/291 |
| 2004/0184132 | A1 * | 9/2004 | Novotny et al. | 359/290 |

OTHER PUBLICATIONS

Wagner, B., et al., "*Bistable Microvalve With Pneumatically Coupled Membranes*", © 1996 IEEE, pp. 384-388, 1996.

Wagner, B., et al., "*Infrared Micromirror Array with Large Pixel Size and Large Deflection Angle*", Transducers '97, 1997 International Conference on Solid-State Sensors and Actuators, © 1997 IEEE, pp. 75-78, Jun. 16-19, 1997.

(Continued)

*Primary Examiner*—David N. Spector
(74) *Attorney, Agent, or Firm*—Wade James Brady, III; Frederick J. Telecky, Jr.

(57) ABSTRACT

A MEMS device includes a hinge that is disposed outwardly from a substrate and capable of at least partially supporting a conductor that is disposed outwardly from the hinge. The conductor being capable of pivoting about a first axis. The device also includes one or more electrostatic fins that are disposed inwardly from and in contact with the conductor. The one or more electrostatic fins being disposed substantially along a second axis that is different than the first axis. The MEMS device further includes one or more electrodes that are formed outwardly from the substrate and inwardly from the conductor. The one or more electrodes being separated from the conductor by a first air gap. The one or more electrodes also being separated from the one or more electrostatic fins by a second air gap that is different than the first air gap.

34 Claims, 2 Drawing Sheets

OTHER PUBLICATIONS

Reimer, K., et al., "*16 k Infrared Micromirror Arrays with Large Beam Deflection and Tenth Millimeter Pixel Size*", Part of the SPIE Conference on Miniaturized Systems with Micro-Optics and MEMS, SPIE vol. 3878, pp. 272-280, Sep. 1999.

Fraunhofer Institut Siliziumtechnologie, "*Achievements and Results Annual Report 2001*", pp. 1-5 and 40-41, 2001.

Sawada, Renshi, et al., "*Improved Single Crystalline Mirror Actuated Electrostatically By Terraced Electrodes With High-Aspect Ratio Torsion Spring*", © 2003 IEEE, pp. 153-154, 2003.

Urano, M., et al., "*Novel Fabrication Process and Structure of a Low-Voltage-Operation Micromirror Array for Optical MEMS Switches*", © 2003 IEEE, IEDM 03-965,—03-968, 39.5.1-39.5.4, 2003.

Cichalewski, Wojciech, et al., "*Analytical modelling and simulations of a MEMS micro-mirror-MATLAB implementation*", CADSM 2003, pp. 360-365, Feb. 18-22, 2003.

Yamamoto, Tsuyoshi, et al., "*A Three-Dimensional MEMS Optical Switching Module Having 100 Input and 100 Output Ports*", IEEE Photonics Technology Letters, vol. 15, No. 10, pp. 1360-1362, Oct. 2003.

Yamamoto, Tsuyoshi, et al., "*Development of a Large-scale 3D MEMS Optical Switch Module*", Selected Papers, NTT Technical Review, vol. 1, No. 7, pp. 37-42, Oct. 2003.

Fraunhofer Institut für Silizium Technologie, "*Digital Micromirror Arrays*", http://www.isit.fhg.de/english/mst/micromirror.html, 2 pages, Oct. 30, 2005.

Rao, Masa P., et al., "*Bulk Micromachined Titanium Micromirror Device With Sloping Electrode Geometry*", Mechanical & Environmental Engineering Department, University of California, Santa Barbara, Santa Barbara, California, 4 pages, Jun. 2004.

Urano, M., et al., "*Fabrication of Low-Voltage Optical MEMS Switches by Using Seamless Integration Technology*", NTT Microsystem Integration Laboratories, Kanagawa, Japan, 1 page, Oct. 3, 2004.

U.S. Appl. No. 11/110,027, filed Apr. 20, 2005 entitled: "*Isolation Layer for Semiconductor Devices and Method for Forming the Same*", 18 pages, Apr. 20, 2005.

U.S. Appl. No. 11/172,348, filed Jun. 30, 2005 entitled: "*Versatile System for Restricting Movement of MEMS Structures*", 30 pages, Jun. 30, 2005.

U.S. Appl. No. 11/304,042, filed Dec. 15, 2005 entitled: "*Ultra Dark Polymer*", 29 pages, Dec. 15, 2005.

U.S. Appl. No. 11/402,411, filed Apr. 12, 2006 entitled: "*System and Method for Increasing Image Quality in a Display System*", 30 pages, Apr. 12, 2006.

U.S. Patent Application filed Aug. 2, 2006 entitled: "*Sloping Electrodes In A Spatial Light Modulator*", 23 pages, Aug. 2, 2006.

U.S. Patent Application filed Aug. 8, 2006 entitled: "*Sloped Catilever Beam Electrode for a MEMs Device*", 25 pages, Aug. 8, 2006.

* cited by examiner

ELECTROSTATIC FINS FOR A MEMS DEVICE

TECHNICAL FIELD OF THE INVENTION

This invention relates in general to microelectromechanical systems (MEMS) and, in particular, to an apparatus having improved electrostatics and a method of manufacturing the same.

BACKGROUND OF THE INVENTION

Digital micromirror devices (DMD) and other microelectromechanical system (MEMS) devices are capable of being used in optical communication and/or projection display systems. DMDs in particular involve an array of micromirrors that selectively communicate at least a portion of an optical signal or light beam. DMDs selectively communicate an optical signal or light beam by pivoting between active "on" and "off" states. To permit the micromirrors to pivot, each micromirror is attached to a hinge that is suspended between a one or more support posts. During operation, conventional DMDs typically form localized peak electrostatic fields that may create undesirable micromirror dynamics.

SUMMARY

In one embodiment, a MEMS device comprises a hinge that is disposed outwardly from a substrate and capable of at least partially supporting a conductor disposed that is outwardly from the hinge. The conductor capable of pivoting about a first axis. The device also comprises one or more electrostatic fins that are disposed inwardly from and in contact with the conductor. The one or more electrostatic fins being disposed substantially along a second axis that is different than the first axis. The device further comprising one or more electrodes formed outwardly from the substrate and inwardly from the conductor. The one or more electrodes being separated from the conductor by a first air gap. The one or more electrodes are separated from the one or more electrostatic fins by a second air gap that is different than the first air gap.

In a method embodiment, a method of forming an apparatus for use with a MEMS device comprises forming a hinge outwardly from a substrate and substantially along a first axis. In addition, the method comprises forming a reflective conductor outwardly from the hinge. The method also comprises forming one or more electrodes outwardly from the substrate and inwardly from the reflective conductor. The one or more electrodes being separated from the reflective conductor by an air gap. The method further comprises forming one or more electrostatic fins inwardly from and in contact with the reflective conductor. The one or more electrostatic fins being disposed substantially along a second axis that is different than the first axis.

Depending on the specific features implemented, particular embodiments of the present invention may exhibit some, none, or all of the following technical advantages. Various embodiments may be capable of enhancing the electrostatic coupling between conductive layers. Some embodiments may be capable of enabling an increased micromirror thickness without compromising reliability.

Other technical advantages will be readily apparent to one skilled in the art from the following figures, description and claims. Moreover, while specific advantages have been enumerated, various embodiments may include all, some or none of the enumerated advantages.

BRIEF DESCRIPTION OF THE DRAWINGS

For a more complete understanding of the present invention, and for further features and advantages thereof, reference is now made to the following description taken in conjunction with the accompanying drawings, in which.

DETAILED DESCRIPTION OF EXAMPLE EMBODIMENTS

Particular examples and dimensions specified throughout this document are intended for example purposes only, and are not intended to limit the scope of the present disclosure. In particular, this document is not intended to be limited to a particular microelectromechanical system (MEMS) device in a spatial light modulator application, such as, a digital micromirror device. Moreover, the illustrations in FIGS. 1 and 2 are not intended to be to scale.

Figure 1:
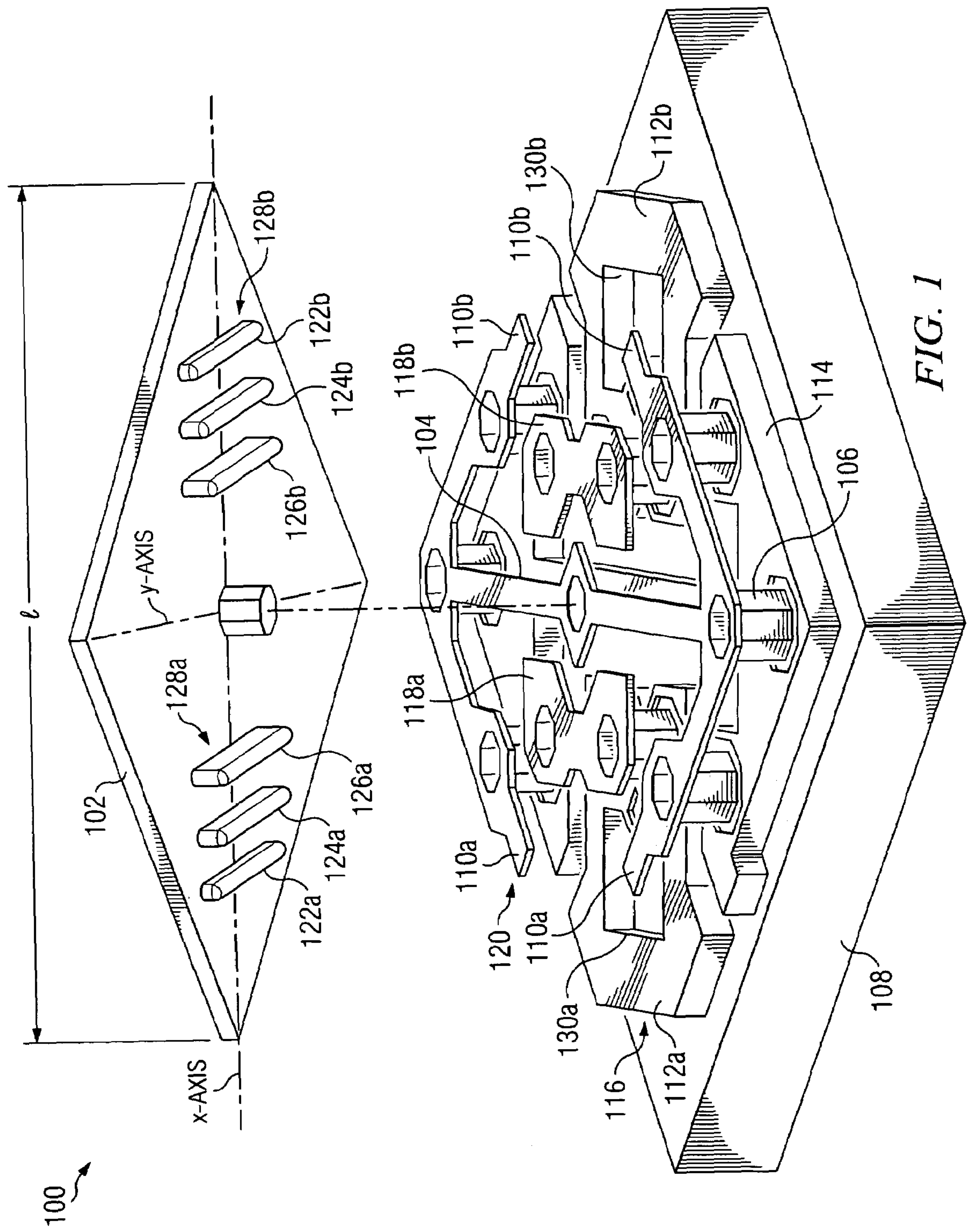
FIG. 1 is a perspective view of one embodiment of a portion of a digital micromirror device.

FIG. 1 is a perspective view of one embodiment of a portion of a digital micromirror (DMD) device 100. In this example, DMD 100 comprises a MEMS device that includes an array of hundreds of thousands of micromirrors (e.g., micromirror 102). In this example, each micromirror 102 is approximately 13.8 square μm in size and has less than a 1 μm gap between adjacent micromirrors. Although each micromirror 102 comprises approximately 13.8 square μm and has less than a 1 μm gap between adjacent micromirrors in this example, other dimensions, shapes or gaps may be used without departing from the scope of the present disclosure. For example, each micromirror 102 can be less than thirteen square μm in size. In addition, each micromirror 102 may tilt up to plus or minus twelve degrees creating an active "on" state condition or an active "off" state condition. Although each micromirror 102 may tilt up to plus or minus twelve degrees in this example, any other appropriate tilt angle may be used without departing from the scope of the present disclosure.

In this example, each micromirror 102 transitions between its active "on" and "off" states to selectively communicate at least a portion of an optical signal or light beam. To permit micromirror 102 to tilt, each micromirror 102 is coupled to one or more hinges 104 coupled between hinge posts 106, and spaced outwardly, by means of an air gap, from a complementary metal-oxide semiconductor (CMOS) substrate 108. In this example, micromirror 102 tilts in the positive or negative direction until it contacts spring tip pairs 110*a* or 110*b* respectively. Although this example includes spring tip pairs 110, other examples may eliminate spring tip pairs 110. In those examples, micromirrors 102 tilt in the positive or negative direction until micromirrors 102 contact a mirror stop (not explicitly shown). In this particular embodiment, hinge 104 is disposed substantially along a first axis (y) of micromirror 102.

In this particular example, first electrodes 112*a* and 112*b*, and conductive conduits 114 are formed within a first conductive layer 116 disposed outwardly from substrate 108. In this example, second electrodes 118*a* and 118*b*, hinge 104, hinge posts 106, and spring tip pairs 110 are formed within a second conductive layer 120 disposed outwardly from first conductive layer 108. Conductive layers 116 and 120 can comprise, for example, an aluminum alloy or other suitable conductive material.

Conductive layer 116 receives a bias voltage that at least partially contributes to the creation of the electrostatic forces developed between first electrodes 112, second electrodes 118 and/or micromirror 102. In this particular example, the latching bias voltage comprises a steady-state voltage. That is, the bias voltage applied to conductive layer 114 remains substantially constant while micromirror 102 is in an "on-state" or "off-state" position. In this example, the latching bias voltage comprises approximately twenty-six volts. Although this example uses a bias voltage of twenty-six volts, other bias voltages may be used without departing from the scope of the present disclosure.

In this particular example, CMOS substrate 108 comprises the control circuitry associated with DMD 100. The control circuitry can comprise any hardware, software, firmware, or combination thereof capable of at least partially contributing to the creation of the electrostatic forces between first electrodes 112, second electrodes 118 and/or micromirror 102. The control circuitry associated with CMOS substrate 108 functions to selectively transition micromirrors 102 between "on" state and "off" state based at least in part on data received from a processor (not explicitly shown). In this example, the control circuitry transitions micromirror 102 between "on" and "off" states by selectively applying a control voltage to at least one first electrode 112 and one second electrode 118 associated with a particular micromirror 102. For example, to transition micromirror 102 from the "off" state to the active "on" state condition, the control circuitry removes the control voltage from electrodes **118*b* and 112*b*, and applies the control voltage to electrodes 118*a* and 112*a***. In this example, the control voltage comprises approximately three volts. Although this example uses a control voltage of approximately three volts, other control voltages may be used without departing from the scope of the present disclosure.

During operation, the application of the control voltage to particular pairs of electrodes (e.g., **112*a* and 118*a*) creates a voltage differential between micromirror 102 and the particular pair of electrodes. This voltage differential creates electrostatic forces between micromirror 102 and the particular pair of electrodes, which causes micromirror 102 to transition between "on" and "off" states. The magnitude of the electrostatic force is based at least in part on the area of micromirror 102, the area of electrodes 118 and 112, and the air gaps between electrodes 118 and 112, and micromirror 102**.

During operation of a conventional DMD, as the micromirror approaches its landing position, portions of the micromirror are minimally spaced from the address electrodes, causing localized peak electrostatic fields. The peak electrostatic field associated with the middle conductive layer address electrode is near the hinge fulcrum while the peak electrostatic field associated with the first conductive layer address electrode is near the far corner of the conventional micromirror. The localized peak electrostatic field locations can create undesirable micromirror dynamics, including over-rotation and vertical hinge oscillation, which could cause destructive shorting between conductive MEMS layers. In addition, the electrostatic coupling between each conventional micromirror and each address electrode is inefficiently limited to the overlap of only two conductive planes.

Unlike conventional DMDs, DMD 100 includes a plurality of electrostatic fins 122-126 disposed inwardly from each micromirror 102. In this particular embodiment, DMD 100 includes a first set of electrostatic fins **128*a* and a second set of electrostatic fins 128*b* disposed inwardly from and in contact with micromirror 102. In this example, first set of fins 128*a* includes electrostatic fins 122*a*, 124*a*, and 126*a*, while second set of fins 128*b* includes 122*b*, 124*b*, and 126*b*. Although this example includes two sets of three electrostatic fins, any other number of electrostatic fins may be used without departing from the scope of the present disclosure. For example, DMD 100** may include one or more electrostatic fins, two or more electrostatic fins, two sets of two or more electrostatic fins, two sets of one or more electrostatic fins, or any other appropriate number of sets and appropriate number of electrostatic fins without departing from the scope of the present disclosure.

In operation, each set of electrostatic fins 128 operates to redistribute the electrostatic fields along the length (l) of the micromirror 102 by balancing out localized field effects. In some cases, each electrostatic fin 122-126 may introduce additional planes of electrostatic coupling or attraction between their associated first electrodes 112 and second electrodes 118. That is, electrostatic fins **122*a*, 124*a*, and 126*a* may introduce additional planes of electrostatic coupling between micromirror 102 and first electrode 112*a* and second electrode 118*a*. The additional planes of electrostatic coupling or attraction can advantageously form an enhanced electrostatic field coupling within DMD 100**.

In various embodiments, the enhanced electrostatic field coupling associated with each pair of electrostatic fins 122-126 can operate to increase the cross-over transition speed of micromirror 102. As used throughout this document the term fin pair refers to a pair of corresponding electrostatic fins that are disposed on opposite sides of the micromirror or conductive layer. For example, electrostatic fin pair 124 refers to electrostatic fins **124*a* and 124*b*. In some cases, the enhanced electrostatic field coupling can increase the cross-over transition speed by, for example, approximately 3% or more for fin pair 126, approximately 2% or more for fin pair 124, approximately 7% or more for fin pair 122, or approximately 10% or more for the combination of all three fin pairs 122-126. The phrase "cross-over transition speed" refers to the speed at which micromirror 102 transitions between its on-state and off-state. In addition, the enhanced electrostatic fields associated with each set of electrostatic fins 128 more efficiently latches micromirror 102** in its active state, resulting in enhanced reliability.

In this particular embodiment, each of electrostatic fins 122-126 is disposed along a second axis (x) of micromirror 102. In this example, the second axis (x) of micromirror 102 is approximately orthogonal to first axis (y) of micromirror 102. Although second axis (x) is orthogonal to first axis (y) in this example, second axis (x) could intersect first axis (y) at any angle without departing from the scope of the present disclosure. In this example, each of electrostatic fins 122, 124, and 126 are disposed at a distance of approximately 6.5 μm, 5.2 μm, and 4.0 μm, respectively, from the center of the micromirror 102. Although each of electrostatic fins 122-126 are disposed at a particular distance from the center of micromirror 102 in this example, the electrostatic fins can be disposed at any desired distance without departing from the scope of the present disclosure.

In this particular embodiment, each of electrostatic fins 122, 124, and 126 are disposed inwardly from micromirror 102 and comprise a depth of approximately 0.25 μm, approximately 0.5 μm, and approximately 0.75 μm, respectively. Although each of electrostatic fins 122-126 are disposed inwardly from micromirror 102 at a particular depth in this example, the electrostatic fins can be disposed at any desired depth without departing from the scope of the present disclosure. In this example, each electrostatic fin 122-126 comprises a length of approximately 3.3 μm and a width of less than 0.4 μm wide. Although each of electrostatic fins 122-126 comprises a length of 3.3 μm and a width of 0.4 μm in this example, the electrostatic fins can be disposed at any desired length and/or width without departing from the scope of the present disclosure. In other embodiments, each of electrostatic fins 122-126 can comprise different lengths and widths. Although this example uses rectangular shaped fins of specific dimensions, any other desired shape or dimension may be used without departing from the scope of the present disclosure.

In other embodiments, electrostatic fins 122-126 may be designed to pass through vias 130 or another gap in a conductive layer during operation, thereby dramatically increasing the electrostatic coupling between conductive layers. For example, electrostatic fins could be disposed inward from micromirror 102 in such a way as to pivot into its respective cutout in first electrodes 112, as indicated by reference numbers 130*a* and 130*b*.

Figure 2A:
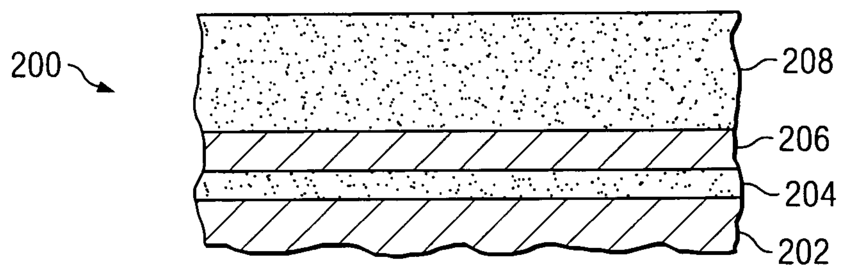
FIGS. 2A through 2C are cross sectional views illustrating one example of a method of forming a portion of a digital micromirror device.
Figure 2B:
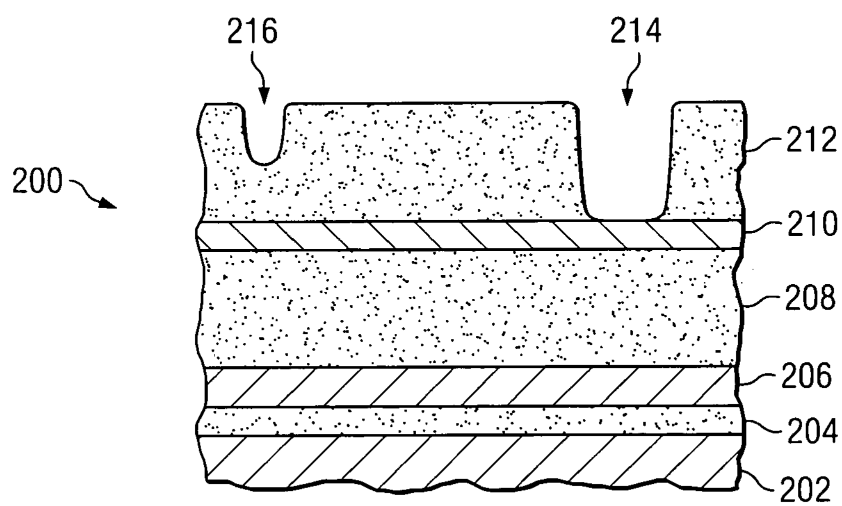
Figure 2C:
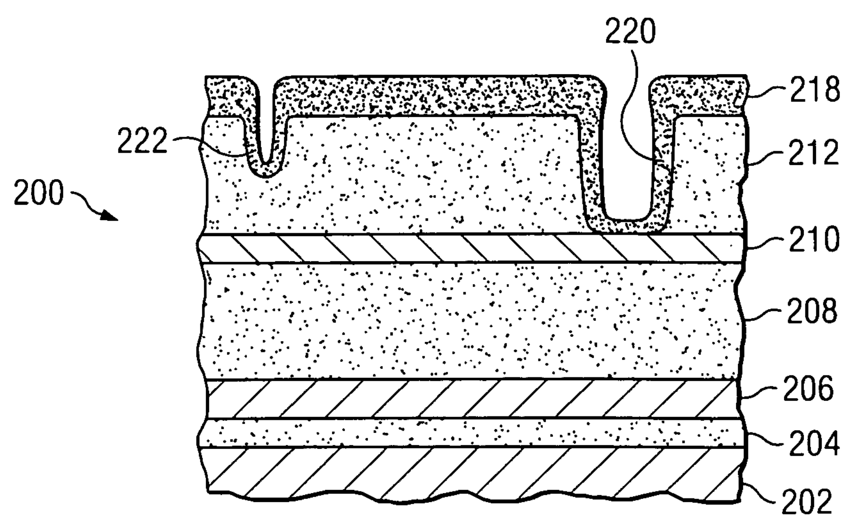

FIGS. 2A through 2C are cross sectional views illustrating one example of a method of forming a portion of a digital micromirror device (DMD) 200. DMD 200 may be used as a basis for forming any variety of MEMS devices, such as an accelerometer, a spatial light modulator, a gain equalizer, an optical filter, or combination of these or other devices. Particular examples and dimensions specified throughout this document are intended for example purposes only, and are not intended to limit the scope of the present disclosure. Moreover, the illustration in FIGS. 2A through 2C are not intended to be to scale.

FIG. 2A shows a cross sectional view of a portion of DMD 200 after the formation of a dielectric layer 204 disposed outwardly from a substrate 202, after formation of a first conductive layer 206 disposed outwardly from dielectric layer 204, and after formation of a first spacer layer 208 disposed outwardly from first conductive layer 206. Although substrate 202 and dielectric layer 204 are shown as being formed without interstitial layers between them, such interstitial layers could alternatively be formed without departing from the scope of the present disclosure.

Substrate 202 may comprise any suitable material used in semiconductor chip fabrication, such as silicon, poly-silicon, indium phosphide, germanium, or gallium arsenide. In various embodiments, substrate 202 can include complementary metal-oxide semiconductor (CMOS) circuitry capable of controlling DMD 200 after its formation. In one non-limiting example, the CMOS circuitry may comprise a CMOS memory circuit, such as, for example, a 5T or 6T SRAM cell.

Dielectric layer 204 may comprise, for example, oxide, silicon dioxide, or oxi-nitride. Forming dielectric layer 204 may be effected through any of a variety of processes. In one non-limiting example, dielectric layer 204 can be formed by depositing an oxide on substrate 202. In some cases, the deposited oxide can be planarized, such as by using a chemical mechanical polish (CMP) technique. Planarizing a deposited oxide layer can advantageously provide a relatively flat surface.

First conductive layer 206 may comprise, for example, aluminum, an aluminum alloy or other conductive material. Where first conductive layer 206 comprises an aluminum alloy, the aluminum alloy may comprise, for example, aluminum, silicon, polysilicon, tungsten, nitride, and/or a combination of these or other conductive materials. In this example, first conductive layer 206 comprises silicon-based aluminum that has light absorbing and/or anti-reflective properties. In other embodiments, first conductive layer 206 may include a dielectric material with anti-reflective properties disposed outwardly from the silicon-based aluminum layer. Forming first conductive layer 206 may be effected through any of a variety of processes, for example, by depositing silicon-based aluminum. Although first conductive layer 206 and dielectric layer 204 are shown as being formed without interstitial layers between them, such interstitial layers could alternatively be formed without departing from the scope of the present disclosure.

At some point, one or more electrodes and conductive conduits (not explicitly shown) associated with DMD 200 are formed within first conductive layer 206. Forming the conductive conduits and the one or more electrodes may be effected through any of a variety of processes. For example, the conductive conduits and one or more electrodes may be formed by removing a portion of first conductive layer 206. In this particular embodiment, the conductive conduits and one or more electrodes are formed, for example, by patterning and etching first conductive layer 206. In some cases, the conductive conduits and one or more electrodes can be formed substantially simultaneously. In other embodiments, the conductive conduits and one or more electrodes can be formed subsequent to one another. In various embodiments, the conductive conduits and one or more electrodes formed in first conductive layer 206 can be substantially similar in structure and function as conductive conduits 114 and first electrodes 112 of FIG. 1.

First spacer layer 208 may comprise, for example, hardened photoresist or other material that may be selectively removed. That is, first spacer layer 208 can be selectively removed using any number of processes, such as, for example, by performing a plasma-ash that does not significantly affect the conductive layer 206 and/or dielectric layer 204. Although first spacer layer 208 and first conductive layer 206 are shown as being formed without interstitial layers between them, such interstitial layers could alternatively be formed without departing from the scope of the present disclosure. Forming first spacer layer 208 may be effected through any of a variety of processes. For example, spacer layer 208 can be formed by depositing a photoresist material. At some point, one or more vias (not explicitly shown) are formed within first spacer layer 208. Forming the vias may be effected through any of a variety of processes. For example, the vias may be formed by removing a portion of first spacer layer 208. In this particular embodiment, the vias are formed by patterning and etching first spacer layer 206. In various embodiments, the vias formed within first spacer layer 208 provide an opening for subsequent formations substantially similar in structure and function as support posts 106 of FIG. 1.

FIG. 2B shows a cross sectional view of a portion of DMD 200 after the formation of a second conductive layer 210 disposed outwardly from first spacer layer 208, after formation of a second spacer layer 212 disposed outwardly from second conductive layer 210, and after formation of a mirror via 214 and electro-static fin via 216 within spacer layer 212. Although second conductive layer 210 and first spacer layer 208 are shown as being formed without interstitial layers between them, such interstitial could alternatively be formed without departing from the scope of the present disclosure.

Second conductive layer 210 may comprise, for example, aluminum, oxygen, titanium, silicon, polysilicon, tungsten, nitride, and/or a combination of these or other materials. In this example, second conductive layer 210 comprises an aluminum alloy that has reflective properties. In other examples, second conductive layer 210 could comprise an aluminum compound that has light absorbing and/or anti-reflective properties. Forming second conductive layer 210 may be effected through any of a variety of processes. For example, second conductive layer 210 can be formed by depositing an aluminum alloy. In some cases, second conductive layer 210 can be formed by depositing 700 angstroms of an aluminum alloy, such as AlTiO.

At some point, one or more electrodes, a hinge, hinge structure, hinge posts, and spring tip pairs (not explicitly shown) associated with DMD 200 are formed within second conductive layer 210. Forming the one or more electrodes, a hinge, hinge posts, and spring tip pairs may be effected through any of a variety of processes. For example, the hinge posts may be formed as conductive layer 210 deposits into the via openings formed in first spacer layer 208 (not explicitly shown). In addition, the one or more electrodes, a hinge, and spring tip pairs may be formed by removing a portion of second conductive layer 210. In this particular embodiment, the one or more electrodes, a hinge, and spring tip pairs are formed by patterning and etching second conductive layer 210. In some cases, the one or more electrodes, a hinge, hinge posts, and spring tip pairs can be formed substantially simultaneously. In other embodiments, the one or more electrodes, a hinge, hinge posts, and spring tip pairs can be formed subsequent to one another. In various embodiments, the one or more electrodes, a hinge, hinge posts, and spring tip pairs formed in second conductive layer 210 can be substantially similar in structure and function as second electrodes 118*a* and 118*b*, hinge 104, hinge posts 106, and spring tip pairs 110 of FIG. 1. In some embodiments, one or more electrostatic fins (not explicitly shown) associated with DMD 200 may be formed within second conductive layer 210.

Second spacer layer 212 may comprise, for example, hardened photoresist or other material that may be selectively removed. That is, second spacer layer 212 can be selectively removed using any number of processes, such as, for example, by performing a plasma-ash that does not significantly affect conductive layers 206, 210 and/or dielectric layer 204. Although second spacer layer 212 and second conductive layer 210 are shown as being formed without interstitial layers between them, such interstitial layers could alternatively be formed without departing from the scope of the present disclosure.

Forming second spacer layer 212 may be effected through any of a variety of processes. For example, second spacer layer 212 can be formed by depositing a photoresist material. Forming mirror via 214 and electrostatic fin via 216 may be affected through any of a variety of processes. For example, mirror via 214 may be formed by removing substantially all of a portion of second spacer layer 212, while electrostatic fin via may be formed by removing some or all of a portion of second spacer layer 212. Although this example illustrates only one electrostatic fin via 216 being formed, any other desired number of electrostatic fin via may be formed without departing from the scope of the present disclosure. In some cases, mirror via 214 and electrostatic fin via 216 can be formed substantially simultaneously. In other embodiments, mirror via 214 and electrostatic fin via 216 can be formed subsequent to one another.

In this particular embodiment, mirror via 214 and electrostatic fin via 216 are formed by patterning and etching conductive layer 212 using photoresist mask and etch techniques. In this example, mirror via 214 is formed by patterning spacer layer 212 with a 1:1 aspect ratio, while electrostatic fin via 216 is formed by patterning spacer layer 212 with a 3:1 aspect ratio. That is, the outermost width of mirror via 214 is approximately the same as the thickness of second spacer layer 212, while the outermost width of electrostatic fin via 216 is approximately ⅓ the thickness of spacer layer 212. Although an aspect ratio of 1:1 and 3:1 are used in this example, any other appropriate aspect ratios may be used without departing from the scope of the present disclosure.

FIG. 2C shows a cross sectional view of DMD 200 after formation of a third conductive layer 218 outwardly from second spacer layer 212 and after forming a mirror post 220 and an electrostatic fin 222 within conductive layer 218. Although third conductive layer 226 and second spacer layer 212 are shown as being formed without interstitial layers between them, such interstitial layers could alternatively be formed without departing from the scope of the present disclosure.

Third conductive layer 218 may comprise, for example, aluminum, silicon, polysilicon, tungsten, nitride, and/or a combination of these or other materials. In this example, third conductive layer 218 comprises a reflective material, such as, for example, aluminum, an aluminum alloy, or any other appropriate reflective material. Although conductive layer 218 comprises a reflective material in this example, any other desired conductive material can be used without departing from the scope of the present disclosure.

Forming third conductive layer 218 may be effected through any of a variety of processes. For example, third conductive layer 218 can be formed by depositing an aluminum alloy. In one non-limiting example, third conductive layer 218 can be formed by sputter-deposition that deposits aluminum along the sidewalls of mirror via 214 and electrostatic fin via 216 to form mirror post 220 and electrostatic fin 222, respectively. In some embodiments, depending on the width of electrostatic fin via 222, a pinch-off of metal at the opening of electrostatic fin via 216 may be sufficient to make light loss negligible.

One aspect of this disclosure recognizes that the formation of one or more electrostatic fins 222 within conductive layer 218 can advantageously enhance the electrostatic fields generated within DMD 200. These enhanced electrostatic fields associated with each electrostatic fin 224 allows device manufacturers to thicken the conductive layer 218 without comprising reliability. In some cases, a thicker third conductive layer 218 can create a larger pinch-off of the metal deposited near the opening of electrostatic fin via 216 and along the sidewalls and base of mirror via 214, resulting in reducing or eliminating light loss while increasing the conductivity and rigidity of mirror post 220.

Electrostatic fins may be used in some MEMS applications where light loss is not a concern. For example, some DMD designs incorporate a moveable beam or yoke (not explicitly shown) attached to the hinge and disposed inwardly from the micromirror. Electrostatic fins extending inwardly from such a beam or yoke may be designed without light-loss concerns because the micromirror "hides" the beam or yoke. Other MEMS embodiments may not incorporate light at all.

Although the present invention has been described in several embodiments, a myriad of changes, variations, alterations, transformations, and modifications may be suggested to one skilled in the art, and it is intended that the present invention encompass such changes, variations, alterations, transformations, and modifications as falling within the spirit and scope of the appended claims.

What is claimed is:

1. An apparatus for use with a digital micromirror, comprising:

a hinge disposed substantially along a first axis outwardly from a substrate, the hinge capable of at least partially supporting a micromirror disposed outwardly from the hinge, the micromirror capable of being selectively transitioned between an on-state position and an off-state position;

one or more electrodes formed outwardly from the substrate and inwardly from the micromirror, the one or more electrodes operable to receive a control voltage, wherein one or more electrodes are separated from the micromirror by an air gap; and one or more electrically-conductive projecting structures disposed inwardly from and in contact with the micromirror, wherein the one or more electrically-conductive projecting structures are individual oriented parallel to the first axis and sequentially disposed along a second axis; and wherein the micromirror is capable of being selectively transitioned between the on-state position and the off-state position based at least in part on the one or more electrically-conductive projecting structures and the control voltage.

2. The apparatus of claim 1, wherein the substrate comprises control circuitry capable of selectively transitioning the micromirror between an on-state position and an off-state position.

3. The apparatus of claim 1, wherein the micromirror selectively transitions between the on-state and off-state by pivoting around the hinge.

4. The apparatus of claim 1, wherein the second axis is different than the first axis.

5. The device of claim 4, wherein the first axis is approximately orthogonal to the second axis.

6. The device of claim 5, wherein the one or more electrically-conductive projecting structures comprise at least three electrically-conductive projecting structures.

7. A micro-electro mechanical system (MEMS) device, comprising:

a hinge disposed substantially along a first axis outwardly from a substrate and capable of at least partially supporting a conductor disposed outwardly from the hinge, the conductor capable of pivoting about the first axis;

one or more electrically-conductive projecting structures disposed inwardly from and in contact with the conductor, the one or more electrically-conductive projecting structures being individually oriented parallel to the first axis and sequentially disposed substantially along a second axis, wherein the second axis is different than the first axis; and one or more electrodes formed outwardly from the substrate and inwardly from the conductor, wherein one or more electrodes are separated from the conductor by a first air gap and wherein the one or more electrodes are separated from the one or more electrically-conductive projecting structures by a second air gap, wherein the first air gap is different than the second air gap.

8. The device of claim 7, wherein the hinge is operable to pivot at least one of the one or more electrically-conductive projecting structures though a gap within the one or more electrodes.

9. The device of claim 7, wherein the first axis is approximately orthogonal to the second axis.

10. The device of claim 7, wherein the conductor comprises a micromirror.

11. The device of claim 7, wherein the conductor selectively transitions between an on-state position and an off-state position by pivoting around the first axis.

12. The device of claim 7, wherein the substrate comprises control circuitry capable of selectively transitioning the conductor between an on-state position and an off-state position.

13. The device of claim 7, wherein the one or more electrodes receive a control voltage and wherein the conductor is capable of being selectively transitioned between the on-state position and the off-state position based at least in part on the electrically-conductive projecting structures and the control voltage.

14. The device of claim 7, wherein the MEMS device comprises a spatial light modulator.

15. The device of claim 7, wherein the one or more electrically-conductive projecting structures comprise at least three pairs of electrically-conductive projecting structures.

16. A method of forming an apparatus for use with a micro-electro mechanical switch (MEMS) device, comprising:

forming a hinge disposed outwardly from a substrate and substantially along a first axis;

forming a reflective conductor disposed outwardly from the hinge;

forming one or more electrodes outwardly from the substrate and inwardly from the reflective conductor, wherein one or more electrodes are separated from the reflective conductor by an air gap; and forming one or more electrically-conductive projecting structures disposed inwardly from and in contact with the reflective conductor, the one or more electrically-conductive projecting structures individually oriented parallel to the first axis and sequentially disposed substantially along a second axis, wherein the second axis is different than the first axis.

17. The method of claim 16, wherein the substrate comprises a material selected from the group consisting of silicon, poly-silicon, indium phosphide, germanium, and gallium arsenide.

18. The method of claim 16, wherein the first axis is approximately orthogonal to the second axis.

19. The method of claim 16, further comprising forming one or more electrically-conductive projecting structures via within one or more sacrificial layers disposed outwardly from a substrate, wherein a dimension of each electrically-conductive projecting structure via permits only partial exposure of the total sacrificial layer thickness during a photo-masking process.

20. A method, comprising:

forming at least one first layer outwardly from a substrate, the at least first layer having a maximum thickness perpendicular to the substrate;

defining at least one void within the at least first layer by patterning, exposing, and etching the at least one first layer, the at least one void having a maximum height perpendicular to the substrate that is less than a total thickness of the at least first layer;

depositing one or more second layers outwardly from and within the one or more first layers, at least a portion of the deposited one or more second layers forming an electrostatic-coupling extension within each void; and forming an array of micromirrors from the one or more second layers.

21. The method of claim 20, wherein each electrostatic-coupling extension formed within each void is individually oriented parallel to a pivot axis of a respective micromirror and sequentially disposed along a second axis different than the pivot axis.

22. An apparatus, comprising:

a micromirror comprising:

a reflective surface disposed substantially along a first plane and operable to selectively reflect a light beam;

an inner surface disposed substantially along a second plane approximately parallel to the first plane;

at least one support structure coupling the micromirror to a hinge disposed substantially along a pivot axis of the micromirror, the at least one support structure spacing the hinge from the second plane by a first distance; and one or more electrostatic-coupling extensions coupled to the micromirror and having a maximum length approximately perpendicular to the second plane that is less than the first distance.

23. The apparatus of claim 22, wherein at least one electrostatic-coupling extension of the one or more electrostatic-coupling extensions is disposed substantially along a second axis approximately parallel to the micromirror pivot axis.

24. The apparatus of claim 22, wherein the reflective surface, the inner surface, and the one or more electrostatic-coupling extensions are formed as a single deposited layer of conductive material.

25. The apparatus of claim 22, further comprising:

one or more electrodes disposed inwardly from the inner surface of the micromirror, the one or more electrodes operable to receive a control voltage; and wherein the micromirror is operable to selectively reflect a light beam based at least in part on the one or more electrostatic-coupling extensions and the control voltage.

26. The apparatus of claim 25, wherein at least one of the one or more electrostatic-coupling extensions is operable to pivot through a gap within at least one of the one or more electrodes.

27. A method, comprising:

selectively removing a portion of a sacrificial layer; and forming one or more ribs within the selectively removed portion of the sacrificial layer, each rib coupled to a micromirror, each rib extending in a direction substantially perpendicular to a light reflecting surface of the micromirror, and each rib laterally displaced from a pivot axis of the micromirror.

28. The method of claim 27, further comprising:

depositing the sacrificial layer to a first thickness; and forming each rib with a maximum length extending perpendicular from the light reflecting surface of the micromirror that is less than the first thickness.

29. The method of claim 27, wherein forming the one or more ribs further comprises depositing a conductive material.

30. The method of claim 27, wherein forming the one or more ribs further comprises depositing a conductive material within and outwardly from the sacrificial layer; and wherein the micromirror comprises at least a portion of the conductive material deposited outwardly from the sacrificial layer.

31. The method of claim 27, further comprising removing at least a portion of the sacrificial layer that remains after forming the one or more ribs within the selectively removed portion of the sacrificial layer.

32. The method of claim 27, further comprising electrically coupling each rib to at least one circuit operable to provide a voltage to the rib.

33. The method of claim 27, wherein at least one rib of the one or more ribs is disposed substantially along a second axis approximately parallel to the micromirror pivot axis.

34. The method of claim 27, further comprising:

patterning and exposing respective portions of the sacrificial layer corresponding to each rib, wherein less than all of a total thickness of the sacrificial layer is exposed.

* * * * *